US005726237A

United States Patent [19]
Satoh et al.

[11] Patent Number: 5,726,237
[45] Date of Patent: Mar. 10, 1998

[54] RUBBER COMPOSITIONS AND PNEUMATIC TIRES USING THE SAME

[75] Inventors: Hidenori Satoh; Shunji Araki, both of Tokyo, Japan; Franco Cataldo, Rome, Italy

[73] Assignee: Bridgestone Corporation, Tokyo, Japan

[21] Appl. No.: 705,176

[22] Filed: Aug. 29, 1996

[30] Foreign Application Priority Data

Aug. 31, 1995 [JP] Japan ................... 7-224019
Aug. 31, 1995 [JP] Japan ................... 7-224020

[51] Int. Cl.$^6$ ................... C08K 3/00
[52] U.S. Cl. ................... 524/495; 524/496
[58] Field of Search ................... 524/495, 496

[56] References Cited

FOREIGN PATENT DOCUMENTS

| | | | |
|---|---|---|---|
| 64-202246 | 1/1989 | Japan . | |
| 64-20246 | 1/1989 | Japan | C08L 9/00 |
| 2-105836 | 4/1990 | Japan | C08L 15/00 |
| 2-105837 | 4/1990 | Japan | C08L 15/00 |
| 6-107863 | 4/1994 | Japan | C08L 21/00 |

*Primary Examiner*—Edward J. Cain
*Attorney, Agent, or Firm*—Sughrue, Mion, Zinn, Macpeak & Seas, PLLC

[57] ABSTRACT

Rubber compositions and pneumatic tires in which the rubber compositions are used. In the rubber compositions, per 100 parts by weight of natural rubber and a conjugated diene-base synthetic rubber such as a butadiene-styrene copolymer rubber, is compounded 30 to 120 parts by weight of a carbon black having both a characteristic (concentration of >C=O functional groups)/$N_2SA \geq 4.0 \times 10^{-4}$ and a characteristic (concentration of >C=O functional groups) $\geq$ (concentration of —OH functional groups)$^2$ − 0.1 × (concentration of —OH functional groups)+0.03, or is compounded 30 to 120 parts by weight of a carbon black having the characteristic (concentration of >C=O functional groups)/$N_2SA \geq 4.0 \times 10^{-4}$ and 0.05 to 5.0 parts by weight of at least one of a silane coupling agent, a hydrazide compound and a thiadiazole compound. The rubber compositions of the present invention and pneumatic tires using the rubber compositions excel in low rolling resistance and wet skid resistance.

28 Claims, No Drawings

RUBBER COMPOSITIONS AND PNEUMATIC TIRES USING THE SAME

BACKGROUND OF THE INVENTION

1. Field of the Invention

The present invention relates to rubber compositions, and more specifically to rubber compositions having excellent low hysteresis loss and a high level of wet skid resistance. Further, the present invention relates to pneumatic tires in which these rubber compositions are used in the tire tread, and more specifically, to pneumatic tires whose low rolling resistance performance (low fuel consumption) is greatly improved and whose wet skid resistance performance is also excellent.

2. Description of the Prior Art

In recent years, as stability and low fuel consumption have been desired of automobiles, the strong need has developed for rubber materials for tires to simultaneously have good wet skid resistance and low hysteresis loss (and thus for tires to have low rolling resistance and low fuel consumption). It is known that, generally, these characteristics are related inversely. More specifically, if the low hysteresis loss (low rolling resistance performance) is improved, the wet skid resistance deteriorates, whereas if the wet skid resistance is improved, the low hysteresis loss deteriorates.

In the conventional art, in order to solve the aforementioned problem, rubber compositions for tires have been improved from both the standpoint of the polymer and the standpoint of the carbon black.

Many techniques are known as methods of improving the rubber composition by the carbon black, and the following are examples of such methods. It is known that if the particle diameter of the carbon black is increased, the rubber composition has low hysteresis loss but the wet skid resistance thereof deteriorates. Here, discussion will be limited to chemical characteristics of the surface of the carbon blacks and the effects of the rubber compositions for a tire (and therefore pneumatic tires using these rubber compositions). JP-A No. 64-20246 discloses a rubber composition having improved heat build-up and an improved reinforcing property at high temperatures by mainly using a carbon black whose pit value and total acid group concentration are specified. JP-A No. 2-105836 discloses a rubber composition having excellent wet skid resistance, low rolling resistance, and reinforcing property at high temperatures by mainly using a carbon black for which the number of oxygen-containing functional groups are specified. JP-A No. 2-105837 discloses a rubber composition which has excellent low rolling resistance and reinforcing property at high temperatures by mainly using a carbon black whose concentration of oxygen-containing functional groups is specified. JP-A No. 4-130144 discloses a rubber composition which has excellent low rolling resistance and wear resistance by mainly using a carbon black in which the relationship between the amount of functional groups which participate in an acetylating reaction with acetic anhydride and the amount of functional groups which produce oxime when reacted with hydroxylamine is specified. JP-A No. 4-189845 discloses a rubber composition which has excellent low rolling resistance and reinforcing property at high temperatures by mainly using a carbon black in which the concentration of —OH functional groups which participate in an acetylating reaction with acetic anhydride is specified. JP-A No. 6-25472 discloses a rubber composition having excellent low rolling resistance and traction by mainly using an oxidized carbon black. JP-A No. 6-107863 discloses a rubber composition which has an excellent reinforcing property by mainly using a carbon black in which the quinone group concentration determined by an oximization method and the total acidity determined by an NaOH neutralization method are specified.

Many of these prior art aimed to achieve a different object than that of the present invention by a rubber composition containing a carbon black having the above-described characteristics, and in some cases a modified rubber, and in some cases various types of compounding agents. Among these prior art, some attempted to achieve the same object as the present invention, but sufficient effects were not achieved. Namely, there has not been known a rubber composition and pneumatic tire in which the low hysteresis loss (low rolling resistance performance) is markedly improved and at the same time the wet skid resistance is high level.

SUMMARY OF THE INVENTION

An object of the present invention is to provide a rubber composition which excels in low hysteresis loss and wet skid resistance. Another object of the present invention is to provide a pneumatic tire in which the low rolling resistance performance and wet skid resistance performance are both improved.

In order to solve the above-described drawbacks, the present inventors diligently studied the chemical structure, chemical characteristics and physical characteristics of the surface of carbon black as well as the molecular structures of various types of rubber additives and rubber base materials. As a result, the present inventors found that the aforementioned desirable properties could be achieved simultaneously by the following means by using a specific carbon black or by using a specific carbon black together with specific additives, and thus, the inventors arrived at the present invention.

A rubber composition of the present invention comprises: a rubber component consisting of at least one rubber selected from the group consisting of conjugated diene-base synthetic rubbers and natural rubber; and a carbon black in an amount of 30 to 120 parts by weight per 100 parts by weight of the rubber component, wherein the carbon black has both of the characteristics represented by following equation (I) and equation (II):

Equation (I)

$$(\text{concentration of} >\!\!C\!\!=\!\!O \text{ functional groups})/N_2SA \geq 4.0 \times 10^{-4}$$

Equation (II)

$$(\text{concentration of} >\!\!C\!\!=\!\!O \text{ functional groups}) \geq (\text{concentration of} -\!\!OH \text{ functional groups})^2 - 0.1 \times (\text{concentration of} -\!\!OH \text{ functional groups}) + 0.03$$

wherein (concentration of $>\!\!C\!\!=\!\!O$ functional groups) expresses the concentration (meq/g) of functional groups which react with hydroxylamine and produce oxime; $N^2SA$ expresses the nitrogen absorption specific surface area ($m_2$/g); and (concentration of —OH functional groups) expresses the concentration (meq/g) of functional groups which participate in an acetylating reaction with acetic anhydride.

A pneumatic tire of the present invention has a tread portion, sidewall portions and bead portions, and used in the tread portion is a rubber composition comprising: a rubber component consisting of at least one rubber selected from the group consisting of conjugated diene-base synthetic rubbers and natural rubber; and a carbon black having both of the characteristics represented by above equation (I) and equation (II), in an amount of 30 to 120 parts by weight per 100 parts by weight of the rubber component.

A rubber composition of the present invention comprises: a rubber component consisting of at least one rubber selected from the group consisting of conjugated diene-base synthetic rubbers and natural rubber; 30 to 120 parts by weight, per 100 parts by weight of the rubber component, of a carbon black having the characteristic represented by following equation (I); and 0.05 to 5.0 parts by weight, per 100 parts by weight of the rubber component, of at least one of: a silane coupling agent selected from the group consisting of compounds represented by following general formulae (III) and (IV), a hydrazide compound selected from the group consisting of compounds represented by following general formulae (V), (VI) and (VII), and a thiadiazole compound selected from the group consisting of compounds represented by following general formula (VIII).

Equation (I)

(concentration of >C=O functional groups)/N$_2$SA≧4.0×10$^{-4}$ wherein (concentration of >C=O functional groups) expresses the concentration (meq/g) of functional groups which react with hydroxylamine and produce oxime; and N$_2$SA expresses the nitrogen absorption specific surface area (m$^2$/g).

General Formula (III)

$Y^1{}_aY^2{}_b$—Si—$C_nH_{2n}S_mC_nH_{2n}$—Si—$Y^1{}_aY^2{}_b$ or $Y^1{}_aY^2{}_b$—Si$C_nH_{2n}$—$X^1$ wherein $X^1$ represents a nitroso group, a mercapto group, an amino group, an epoxy group, a vinyl group, a chlorine atom, or an imide group; $Y^1$ represents an alkoxy group having from 1 to 4 carbon atoms or a chlorine atom; $Y^2$ represents an alkyl group having from 1 to 4 carbon atoms; a is an integer from 1 to 3, b is an integer from 0 to 2, and a+b=3; and n and m are respectively integers from 1 to 6.

General Formula (IV)

$Y^1{}_aY^2{}_b$—Si$C_nH_{2n}S_m$—$X^2$ wherein $X^2$ is represented by the following formula:

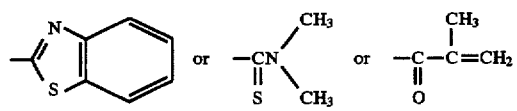

wherein $Y^1$ represents an alkoxy group having from 1 to 4 carbon atoms or a chlorine atom; $Y^2$ represents an alkyl group having from 1 to 4 carbon atoms; a is an integer from to 3, b is an integer from 0 to 2, and a+b=3; and n and m are respectively integers from 1 to 6.

 General Formula (V)

 General Formula (VI)

O
‖
L—CNHNH$_2$      General Formula (VII)

wherein A represents an aromatic ring, a saturated or unsaturated hydantoin ring, or a linear saturated or unsaturated alkyl group having from 1 to 18 carbon atoms; n is 0 or 1; B represents an aromatic ring; Z represents a hydroxyl group or an amino group; and L represents a pyridyl group or a hydrazino group.

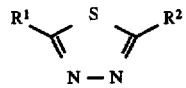 General Formula (VIII)

wherein $R^1$ represents a mercapto group; and $R^2$ represents a mercapto group, an amino group or a trifluoromethyl group.

A pneumatic tire of the present invention has a tread portion, sidewall portions and bead portions, and used in the tread portion is a rubber composition comprising: a rubber component consisting of at least one rubber selected from the group consisting of conjugated diene-base synthetic rubbers and natural rubber; 30 to 120 parts by weight, per 100 parts by weight of the rubber component, of a carbon black having the characteristic represented by above equation (I); and 0.05 to 0.5 parts by weight, per 100 parts by weight of the rubber component, of at least one of: a silane coupling agent selected from the group consisting of compounds represented by above general formulae (III) and (IV), a hydrazide compound selected from the group consisting of compounds represented by above general formulae (V), (VI) and (VII), and a thiadiazole compound selected from the group consisting of compounds represented by above general formula (VIII).

In one embodiment, the carbon black compounded in the rubber composition of the present invention must have the following two characteristics: (concentration (meq/g) of >C=O functional groups)/N$_2$SA (m$^2$/g)≧4.0×10$^{-4}$ (which is referred to hereinafter as characteristic X), and (concentration of >C=O functional groups)≧(concentration of —OH functional groups)$^2$–0.1×(concentration of —OH functional groups)+0.03 (hereinafter referred to as characteristic Y). Various functional groups exist on the carbon black surface, and the carbon black is specified by using various characteristics based on these functional groups as in the above description of the prior art. In the present invention, in one embodiment, a carbon black is used which is specified by characteristic X and characteristic Y which are related to the concentration of >C=O functional groups and/or the concentration of —OH functional groups. The carbon black of the present invention is a carbon black of new specifications that has not been known conventionally. Characteristic X expresses the necessary concentration of >C=O functional groups, and characteristic Y expresses the relative difference in concentrations of the >C=O functional groups and the —OH functional groups. By using a carbon black which exhibits both characteristic X and characteristic Y, the rubber composition exhibits a low hysteresis loss effect and a wet skid resistance effect. If the carbon black lacks either of these characteristics, it is difficult for both of these effects to be exhibited simultaneously. A carbon black in which the value is less than 4.0×10$^{-4}$ in characteristic X and the inequality is not satisfied in characteristic Y will not exhibit these effects to a sufficient degree.

In another embodiment, in a case in which the carbon black compounded in the rubber composition off the present invention is used together with at least one specific additive, it suffices for the carbon black to satisfy aforementioned characteristic X. Various functional groups exist on the carbon black surface, and the carbon black is specified by using various characteristics based on these functional groups as in the above description of the prior art. In this embodiment of the present invention, a carbon black is used which is specified by characteristic X which is related to the concentration of >C=O functional groups. Characteristic X expresses the necessary concentration of >C=O functional groups. By using a carbon black which exhibits characteristic X and specific additives as will be described hereinafter, the rubber composition exhibits improved low hysteresis loss property and wet skid resistance. If either the carbon black or the specific additives are missing, it is difficult for both of these effects to be exhibited simultaneously. A carbon black having a value of less than $4.0 \times 10^{-4}$ (meq/m$^2$) in characteristic X will not sufficiently exhibit these effects.

The carbon black used in the present invention is not particularly limited provided that it satisfies both characteristic X and characteristic Y or that it satisfies characteristic X if at least one specific additive is used, and the carbon black may be a commercially available product, may be produced by treating a commercially available product, or may be a novel carbon black. Examples of the carbon black used in the present invention include (1) gas furnace black, (2) channel-type carbon black, (3) a carbon black obtained by oxidizing furnace black (including oil furnace black and gas furnace black) or channel-type carbon black by an oxidizing agent such as HNO$_3$, H$_2$O$_2$, O$_3$, or dichromate, (4) a carbon black obtained by heating gas furnace black or channel-type carbon black at temperatures of 100° to 900° C., and (5) a carbon black obtained by subjecting the oxidized carbon black of above (3) to heat processing at temperatures of 100° to 900° C. Among these, the carbon blacks (3) and (5) are preferable from the standpoint of the effects which are achieved.

The compounded amount of the carbon black used in the rubber composition of the present invention is 80 to 120 parts by weight, and preferably 35 to 100 parts by weight, per 100 parts by weight of the rubber component. If the compounded amount is less than 30 parts by weight, a rubber composition having a sufficient modulus of elasticity cannot be obtained, and the reinforcing property cannot be ensured. If the compounded amount exceeds 120 parts by weight, sufficient carbon dispersion cannot be obtained, and the reinforcing effect deteriorates.

The rubber component used in the rubber composition of the present invention is at least one rubber selected from the group of conjugated diene-base synthetic rubbers and natural rubber.

The conjugated diene-base synthetic rubber may be (1) a rubber obtained by polymerizing a conjugated diene monomer, (2) a rubber obtained by copolymerizing a conjugated diene monomer and a vinyl aromatic hydrocarbon monomer, or (3) a rubber obtained by modifying the conjugated diene rubber end of above (1) or the conjugated diene/vinyl aromatic hydrocarbon copolymer rubber end of above (2) by a functional group selected from the group of tin-containing groups and nitrogen-containing groups. Among these, above rubber (3) is preferable from the standpoint of improving low hysteresis loss and wet skid resistance. These synthetic rubbers may be used singly, or two or more may be used together. Further, a blend of natural rubber and one or more of these synthetic rubbers is also preferably used. In this case, the synthetic rubber/natural rubber weight ratio is preferably around 90/10 to 30/70.

Examples of the conjugated diene monomer include 1,3-butadiene, isoprene, 2,3-dimethyl-1,3-butadiene, 1,3-pentadiene and 1,3-hexadiene, as well as mixtures thereof. Among these, 1,3-butadiene and isoprene are preferable. Examples of preferable conjugated diene rubbers include high cis-1,4-polybutadiene, low cis-1,4-polybutadiene and high cis-1,4-polyisoprene.

Examples of the vinyl aromatic hydrocarbon monomer include styrene, vinyltoluene, α-methylstyrene, p-methylstyrene and t-butylstyrenes. Among these, styrene is preferable. Preferable conjugated diene/vinyl aromatic hydrocarbon copolymer rubbers include styrene-butadiene rubber.

With regard to the microstructure of the conjugated diene/vinyl aromatic hydrocarbon copolymer rubber, e.g., styrene-butadiene rubber, the compositional distribution may be random-type, block-type or an intermediate-type between random-type and block-type. A random-type compositional distribution is preferable. The amount of vinyl linkage of the conjugated diene portion is not particularly limited. When polymerization is carried out by using a lithium compound initiator system, the amount of vinyl linkage is usually around 20 to 80%. The styrene/butadiene weight ratio is not particularly limited and is usually within the range of 10/90 to 60/40. As a random-type styrene-butadiene rubber, a rubber obtained by emulsion polymerization or solution polymerization is preferably used.

The conjugated diene rubber and the conjugated diene/vinyl aromatic hydrocarbon copolymer rubber can respectively be easily obtained by polymerizing or copolymerizing a predetermined amount of the above-described monomer while using, for example, an organic lithium compound as the initiator. The organic lithium compound may be any of generally known compounds and is not particularly limited. Examples include alkyllithiums such as methyllithium, ethyllithium, propyllithium, n-butyllithium, sec-butyllithium, tert-butyllithium, hexyllithium and octyllithium; aryllithiums such as phenyllithium, tolyllithium and lithium naphthalide; alkenyllithiums such as vinyllithium and propenyllithium; alkylenedilithiums such as tetramethylenedilithium, pentamethylenedilithium, hexamethylenedilithium, heptamethylenedilithium and decamethylenedilithium; and organic lithium compounds containing an atom other than a carbon atom or a hydrogen atom.

The amount of the organic lithium compound is determined in accordance with the desired molecular weight of the rubber. Generally, 0.05 to 15 mmol and preferably 0.1 to 10 mmol of the organic lithium compound is used per 100 g of the monomer. When the amount used exceeds 15 mmol, it is difficult to obtain a high molecular weight polymer, and when the amount is less than 0.05 mmol, the polymerization initiator may deactivate due to impurities within the polymeric system such that polymerization does not proceed.

In the case of the conjugated diene rubber or the conjugated diene/vinyl aromatic hydrocarbon copolymer rubber, when it is desired to obtain a rubber of a desired molecular structure, a randomizer is preferably used in the rubber composition of the present invention. Here, "randomizer" is intended to mean a compound which controls the microstructure of the rubber, e.g., increases the amount of vinyl linkage of the butadiene portion of the polybutadiene or the styrene-butadiene rubber and controls the compositional distribution of the monomer units of the conjugated diene/vinyl aromatic hydrocarbon copolymer rubber, e.g., randomizes the butadiene units and the styrene units of the styrene-butadiene rubber.

The randomizer is not particularly limited, and any generally-known randomizer can be used. Examples of the randomizer include ethers such as tetrahydrofuran (THF), tetrahydropyran, 1,4-dioxane, monoglycolmethylether (monoglyme), diglycolmethylether (diglyme) and triglycolmethylether (triglyme); oligomeric oxolanyl alkane compounds such as bis(2-oxolanyl)methane, 2,2-bis(2-oxolanyl) propane, 1,1-bis(2-oxolanyl)ethane and 2,2-bis(5-methyl-2-oxolanyl)propane; and tertiary amine compounds such as triethylamine, tripropylamine, tributylamine, N,N,N',N'-tetramethylethylenediamine (TMEDA) and dipiperidinoethane.

The amount off the randomizer is in a range of 0.01 to 100 mol per 1 mol of the organic lithium compound.

Polymerization can be carried out at any arbitrary temperature within the range of −80° to 150° C., and temperatures off −20° to 100° C. are preferable. The polymerization reaction can be carried out under a developing pressure, and it is desirable that pressure sufficient to maintain the monomer substantially in a liquid phase is usually applied. More specifically, the pressure depends on the various substances to be polymerized as well as the diluent used and the polymerization temperature. If desired, a higher pressure can be used, and the pressure can be obtained by an appropriate method such as pressurizing the reaction vessel with an inert gas for the polymerization reaction.

Either bulk polymerization, solution polymerization or emulsion polymerization can be used as the method of polymerization. However, using solution polymerization in an inert solvent is optimal. It is preferable that the solvent is a liquid under usual polymerization reaction conditions, and aliphatic, alicyclic or aromatic hydrocarbons may be used. Preferable examples of the inert solvent include propane, butane, pentane, hexane, heptane, isooctane, cyclopentane, cyclohexane, methylcyclohexane, decane, benzene, toluene, xylene, naphthalene and tetrahydronaphthalene. These solvents may also be used as a mixture of two or more thereof. Generally, it is optimal to remove water, oxygen, carbon dioxide, and other catalyst poisons from all of the substances which participate in the polymerization process such as the initiator component, the solvent and the monomer.

The following rubbers are two examples of the tin-modified rubber which is used in the rubber composition of the present invention: (1) as described above, a rubber which is obtained by reacting, for example, a tin-containing compound with the active end of a conjugated diene rubber obtained by polymerizing a monomer with an organic lithium compound initiator, or with the active end of a conjugated diene/vinyl aromatic hydrocarbon copolymer rubber obtained by copolymerizing monomers with an organic lithium compound initiator; and (2) a rubber obtained by polymerizing the above conjugated diene monomer or copolymerizing a conjugated diene monomer and a vinyl aromatic hydrocarbon monomer by using a tin-containing initiator in the same manner as using the organic lithium initiator as described above.

The tin-containing compound used as a modifier is a compound represented by the following general formula:

SnR$^1$pXq

or

R$^1$pSn—(OCO—R$^2$)$_{4-p}$

wherein R$^1$ and R$^2$ are each a substituent group selected from the group consisting of alkyl group, alkenyl group, cycloalkyl group, and aryl group, and R$^1$ and R$^2$ may be the same or different; X is a halogen atom; p is an integer from 0 to 3; and p+q=4. Chlorine or bromine are preferably used for the halogen atom X. A group having 1 to 20 carbon atoms is preferably used for the alkyl group or the alkenyl group used for R$^1$ and R$^2$, and a group having from 6 to 20 carbon atoms is preferably used for the cycloalkyl group or the aryl group used for R$^1$ and R$^2$.

Specific examples of tin halide compounds expressed by the above general formula SnR$^1$pXq include tintetrachloride, tintetrabromide, methyltintrichloride, butyltintrichloride, octyltintrichloride, phenyltintrichloride, phenyltintribromide, tolyltintrichloride, dimethyltindichloride, dimethyltindibromide, diethyltindichloride, dibutyltindichloride, dioctyltindichloride, diphenyltindichloride, diallyltindichloride, dibutenyltindichloride and tributyltinchloride.

Examples of the tin carboxylate compound represented by the above general formula R$^1$pSn—(OCO—R$^2$)$_{4-p}$ include methyltintristearate, ethyltintristearate, butyltintrioctanoate, butyltintristearate, octyltintristearate, butyltintrilaurate, dibutyltindioctanoate, dibutyltindistearate, dibutyltindilaurate, dimethyltindistearate, diethyltindilaurate, dioctyltindistearate, trimethyltinlaurate, trimethyltinstearate, tributyltinoctanoate, tributyltinstearate, tributyltinlaurate, trioctyltinstearate, phenyltintristearate, phenyltintrioctanoate, phenyltintrilaurate, diphenyltindistearate, diphenyltindioctanoate, diphenyltindilaurate, triphenyltinstearate, triphenyltinoctanoate, triphenyltinlaurate, cyclohexyltintristearate, dicyclohexyltindistearate, tricyclohexyltinstearate, tributyltinacetate, dibutyltindiacetate, and butyltintriacetate.

The reaction of the tin-containing compound and the active end of the rubber is usually carried out at 30° to 120° C. for 0.5 minutes to 1 hour.

The amount of the tin-containing compound used is, per 1 mol equivalent of the lithium in the end, 0.4 to 1.5 mol equivalent based on the halogen atom in a case in which a tin halide compound is used. Further, in a case in which a tin carboxylate compound is used, 0.2 to 3.0 mol equivalent of carboxyl groups is used per 1 mol equivalent of the lithium, and preferably 0.4 to 1.5 mol equivalent of carboxyl groups is used per 1 mol equivalent of the lithium. If the amount of the tin halide compound is less than 0.4 mol equivalent or the amount of the tin carboxylate compound is less than 0.2 mol equivalent, the low hysteresis loss property of a vulcanizate of the obtained rubber tends to deteriorate. If the amount of the tin halide compound exceeds 1.5 mol equivalent or the amount of the tin carboxylate compound exceeds 3.0 mol equivalent, a gel-like polymer is formed, and the low hysteresis loss property of a vulcanizate thereof tends to deteriorate.

The tin-containing initiator may be obtained, for example, by reacting a lithium metal with an organic tin halide compound having the general formula R$^3$$_3$SnX. In this formula, R$^3$ is selected from the group consisting of an alkyl group having 1 to 20 carbon atoms, a cycloalkyl group having 3 to 20 carbon atoms, an aryl group having 6 to 20 carbon atoms, and an aralkyl group having 7 to 20 carbon atoms. Examples of the alkyl group include n-butyl, sec-butyl, methyl, ethyl and isopropyl. Examples of the cycloalkyl group include cyclohexyl and menthyl. Examples of the aryl group and the aralkyl group include phenyl, benzyl and naphthyl. In the Formula, X is preferably a chlorine atom or a bromine atom.

Another example of tin-containing initiators may be obtained by, for example, reacting a lithium metal with an organic tin compound containing a tin-tin bond and expressed by general formula $R^4{}_3SnSnR^4{}_3$ (where $R^4$ has the same definition as $R^3$). An optimal organic tin compound or this type has 6 to 120 carbon atoms, and an example thereof is $(C_4H_9)_3SnSn(C_4H_9)_3$.

The tin-containing initiator is preferably $R^3{}_3SnLi$ (wherein $R^3$ is as defined above) which is obtained by reacting a lithium metal with an organic tin halide compound. Tributyltinlithium is an example thereof.

The Following two rubbers are examples of the nitrogen-containing rubber used in the rubber composition of the present invention: (1) as described previously, a rubber obtained by reacting, for example, an isocyanate compound, a dialkylamino-substituted aromatic compound or a nitrogen-containing heteroaromatic compound with the active end of a conjugated diene rubber obtained by polymerizing a monomer by using an organic lithium compound initiator, or with the active end of a conjugated diene/vinyl aromatic hydrocarbon copolymer rubber obtained by copolymerizing monomers by using an organic lithium compound initiator; and (2) a rubber obtained by polymerizing the above conjugated diene monomer or by copolymerizing a conjugated diene monomer and a vinyl aromatic hydrocarbon monomer by using a nitrogen-containing organic lithium initiator in the same way as described above, wherein the initiator here is prepared in advance or prepared in situ in the presence of the monomer.

Examples of the isocyanate compound include 2,4-toluenediisocyanate, 2,6-tolylenediisocyanate, diphenylmethanediisocyanate, naphthalenediisocyanate, tolidinediisocyanate, triphenylmethanetriisocyanate, p-phenylenediisocyanate, tris(isocyanatephenyl)thiophosphate, xylyleneisocyanate, benzene-1,2,4-triisocyanate, naphthalene-1,2,5,7-tetraisocyanate, naphthalene-1,3,7-triisocyanate, phenylisocyanate, hexamethylenediisocyanate and methylcyclohexanediisocyanate. Preferably used are aromatic diisocyanates, aromatic triisocyanates, dimers and trimers of aromatic isocyanate compounds, and adducts of the aforementioned aromatic isocyanates and polyol or polyamine. Aromatic polyisocyanate compounds such as 2,4-tolylenediisocyanate, diphenylmethanediisocyanate and naphthalenediisocyanate are more preferably used.

Examples of the dialkylamino-substituted aromatic compound include N,N'-dimethylaminobenzophenone, N,N'-diethylaminobenzophenone, N-dimethylaminobenzaldehyde, N-diethylaminobenzaldehyde, N-dimethylaminobenzoylchloride, methylester of N-dimethylaminobenzoic acid, p-diethylaminostyrene, p-dimethylaminostyrene, p-dimethylamino-α-methylstyrene and 1-(N-dimethylamino)-4-chlorobenzene.

Examples of the nitrogen-containing heteroaromatic compound include 4-vinylpyridine, 2-vinylpyridine, bis(2-pyridyl)ketone and bis(4-pyridyl)ketone.

1 to 10 mol equivalent, and preferably 0.2 to 3 mol equivalent of these compounds as the reaction group are used per 1 mol equivalent of the lithium atoms at the active end of the rubber. If the amount of the compound is less than 0.1 mol equivalent, the reactivity with the carbon black is insufficient, and the reinforcing property tends to deteriorate. Further, even if more than 10 mol equivalent of the compound is used, the improvement has reached its saturation point and no further improvements can be obtained by the addition of more of the compound. Consequently, amounts in excess of 10 mol equivalent are disadvantageous from an economic standpoint.

The coupling reaction of the active end of the rubber and the above-described compounds may be carried out at 0° C. to 150° C. A constant temperature may be maintained throughout the coupling reaction, or the temperature may be raised throughout the course of the coupling reaction.

The lithium amide initiator is prepared by reacting an above-described organic lithium compound with a secondary amine compound which is an amine compound or an imine compound. Examples of the amine compound include dimethylamine, diethylamine, dipropylamine, di-n-butylamine, diisobutylamine, dipentylamine, dihexylamine, diheptylamine, dioctylamine, diallylamine, dicyclohexylamine, butylisopropylamine, dibenzylamine, methylbenzylamine, methylhexylamine and ethylhexylamine. Examples of the imine compound include trimethyleneimine, pyrrolidine, piperidine, 2-methylpiperidine, 3-methylpiperidine, 4-methylpiperidine, 3,5-dimethylpiperidine, 2-ethylpiperidine, hexamethyleneimine, heptamethyleneimine, morpholine, N-methylpiperazine, N-ethylpiperazine, N-methylimidazolidine, N-ethylimidazolidine, oxazine, pyrroline, pyrrole and azepine.

The amount of the secondary amine is 0.01 to 20 mol equivalent, preferably 0.1 to 5.0 mol equivalent, and more preferably 0.2 to 1.5 mol equivalent per 1 mol equivalent of lithium atom in the organic lithium compound. A large amount of the secondary amine leads to an increase in the hysteresis loss of the rubber. If the amount of the secondary amine is less than 0.01 mol equivalent, the efficiency in introducing a tertiary amine to the polymer chain deteriorates. When the amount of the secondary amine exceeds 20 mol equivalent weight, the generated amount of amine-containing oligomers, which do not contribute to the improvement of the physical properties, becomes large, which is not preferable.

The above explanation is described as an example of a rubber obtained by modifying only one end of a conjugated diene rubber chain or only one end of a conjugated diene/vinyl aromatic hydrocarbon copolymer rubber chain by a tin-containing group or a nitrogen-containing group. On the other hand, because the tin-containing initiator or the nitrogen-containing initiator is a living polymerization initiator, the ends of the resultant rubber are active. Therefore, the active end can react with an above-described tin-containing compound or nitrogen-containing compound, and a rubber having a tin-containing group or a nitrogen-containing group at both ends of the chain can be obtained. Accordingly, a rubber can be obtained in which a desired tin-containing group or nitrogen-containing group is introduced arbitrarily to one end or both ends of the rubber.

The silane coupling agent used in the rubber composition of the present invention is selected from the group of compounds represented by above general formulae III and IV. Examples of the compound of general formula III include bis-(3-triethoxysilylpropyl)tetrasulfide and γ-mercaptopropyltrimethoxysilane. Examples of the compound of general formula IV include 3-trimethoxysilylpropyl-N,N-dimethylthiocarbamoyl tetrasulfide, trimethoxysilylpropyl-mercaptobenzothiazol tetrasulfide, triethoxysilylpropylmethacrylate monosulfide and dimethoxymethylsilylpropyl-N,N-dimethylthiocarbamoyl tetrasulfide. Among these, bis-(3-triethoxysilylpropyl)tetrasulfide and γ-mercaptopropyltrimethoxysilane are preferable from the point of view of the low hysteresis loss effect.

The hydrazide compound used in the rubber composition of the present invention functions as a low hysteresis loss promoting agent and is selected from the group of compounds expressed by above general formulae V, VI and VII. Examples of the compound of general formula V include isophthaloyl dihydrazide, terephthaloyl dihydrazide, azelaoyl dihydrazide, azepinoyl dihydrazide, succinoyl dihydrazide, icosanoyl hydrazide, 7,11-octadecadiene-1,18-dicarbohydrazide and 1,3-bis(hydrazinocarboethyl)-5-isopropylhydantoin. Examples of the compound of general formula VI include 2-hydroxy-3-naphthoyl hydrazide, anthraniloyl hydrazide, salicyloyl hydrazide and 4-hydroxybenzoyl hydrazide. Examples of the compound of general formula VII include carbodihydrazide and isonicotinoyl hydrazide. Among these, 2-hydroxy-3-naphthoyl hydrazide is preferable from the standpoint of the low hysteresis loss effect.

The thiadiazole compound used in the rubber composition of the present invention functions as a low hysteresis loss promoting agent and is selected from the group of compounds represented by above general formula VIII. Examples of the compound of formula VIII include 2,5-dimercapto-1,3,4-thiadiazole, 2-amino-5-mercapto-1,3,4-thiadiazole and 2-amino-5-trifluoromethyl-1,3,4-thiadiazole. Among these, 2,5-dimercapto-1,3,4-thiadiazole is preferable from the standpoint of low hysteresis loss effect.

The compounding amounts of the compounds expressed by general formulae III through VIII are, per 100 parts by weight of the rubber component, 0.05 through 5.0 parts by weight, and preferably 0.1 to 1.0 parts by weight. If the compounding amount is less than 0.05 parts by weight, sufficient effects are not achieved. A compounding amount exceeding 5.0 parts by weight is not preferable from the standpoint of the balance with the other physical properties of the rubber.

In the rubber composition of one embodiment of the present invention, a conjugated diene-base synthetic rubber and a carbon black specified by characteristic X and characteristic Y interact, and the low hysteresis loss property is improved. Due to the reinforcing effects caused by the interaction, the wet skid resistance is also improved. Further, the effects of the rubber composition of the present invention are enhanced even more when a tin-containing or nitrogen-containing conjugated diene rubber or conjugated diene/ vinyl aromatic hydrocarbon copolymer rubber is used as the conjugated diene-base synthetic rubber. This is most likely due to the interaction between the modifying group of the rubber and the specified functional group of the surface of the carbon black.

In another embodiment, one functional group of a coupling agent and/or a low hysteresis loss promoting agent reacts with a functional group of a carbon black specified by characteristic X. Respective another ends of these additives interact with a conjugated diene-base synthetic rubber, and the low hysteresis loss property is improved. Due to the reinforcing effects caused by the interaction, the wet skid resistance is also improved.

Compounding agents used ordinarily in the rubber industry, such as other reinforcing fillers, non-reinforcing inorganic fillers, vulcanizing agents, stearic acid, zinc oxide, vulcanizing accelerators, anti-oxidants and softeners, can be compounded appropriately in the rubber composition of the present invention.

The rubber composition of the present invention is preferably used as the tread rubber for a tire and the sidewall rubber for a tire, and especially as the tread rubber. The rubber composition is also used for other rubber products of which low hysteresis loss property is required, such as belts and shock absorbers.

EXAMPLES

The present invention will be concretely described hereinafter by the following Examples. It is to be noted that the present invention is not limited to the following Examples, and other embodiments are possible within the scope off the invention.

Various measurements were taken as follows.

*Measurement of $N_2SA$ (Nitrogen Absorption Specific Surface Area)

In accordance with ASTM D3037, the specific surface area ($m^2$) per 1 g of carbon black was determined from the absorbed amount of nitrogen ($N_2$).

*Measurement of >C=O Functional Group Concentration
1) Preparation of Oximized Carbon Black About 1.5 g of carbon black was placed into two Erlenmeyer flasks, respectively. A solution in which 1 g of hydroxylamine hydrochlorate had been dissolved in 20 ml of pyridine was added to one of the flasks, whereas 20 ml of pyridine was added to the other flask. A condenser was attached to the upper portion of the Erlenmeyer flask, and a calcium chloride tube and a deoxigenating apparatus were connected to the condenser. A stream of nitrogen gas was passed through the entire apparatus to displace the air such that a nitrogen atmosphere was obtained.

The flasks were placed in an oil bath maintained at 100° C., and the reaction was carried out for 16 hours at that temperature. After the reaction was completed, while the reactants were cooling, 50 ml of 3 normal hydrochloric acid was added and the excess hydroxylamine was neutralized. The contents were suction filtered, and the oximized carbon black was separated and rinsed with about 300 ml of distilled water. The rinsed oximized carbon black was transferred onto a No. 5B filter paper and again rinsed with 300 ml of distilled water.

After rinsing, the oximized carbon black was placed in a drying apparatus maintained at 105° C. and was dried until a constant weight was reached, and the oximized carbon black was thus prepared. (The same operations were also carried out for the blank.)

2) Quantitative Determination of Nitrogen
① Preparation of the Sample for Quantitative Determination About 0.2 grams of the oximized carbon black and about 0.2 grams of a control carbon black were accurately measured and placed into respective semi-micro-Kjeldahl decomposition bins. 2.5 g of calcium sulfate and 0.02 g of mercury (II), and lastly, 4 ml of concentrated sulfuric acid were added to each bin.

The decomposition bin was attached to a semi-micro-Kjeldahl decomposition apparatus. A stream of tap water was passed through an exhaust gas suction aspirator, and the gas burner was ignited. The intensity of the flame of the burner was made weak to the extent that the contents within the decomposition bin did not boil at first. When the amount of white smoke generated from the decomposition bin decreased such that there was little white smoke, the intensity off the flame was then gradually increased to the extent that the contents boiled. This high heat was maintained for 1 hour after the contents of the decomposition bin had become completely transparent. The flame was then turned off, and after the bin had cooled in air to room temperature, the bin was removed from the decomposition apparatus, and approximately 10 ml of distilled water was added to the bin portion by portion. The solution of the contents was placed in a sampling flask of a semi-micro-Kjeldahl nitrogen distilling apparatus. The decomposition bin was washed several times with a small amount of water, and the water was added to the solution in the sampling flask.

② Quantitative Determination of Nitrogen

The sampling flask was attached to the distilling apparatus, and a beaker containing 5 ml of a 2% boric acid solution was connected to the outlet of a condenser mounted onto the distilling apparatus. 25 ml of a sodium hydroxide/ sodium thiosulfate (50%/5%) solution was injected from the alkali injection opening of the distilling apparatus. The injection opening and the vapor opening were closed, and distillation was carried out for 9 minutes in order to trap the ammonia into the boric acid solution.

The 2% boric acid solution in which ammonia had been dissolved was titrated with 1/100 normal hydrochloric acid.

Using an ammonium sulfate solution with a precisely-known amount of nitrogen, the same operations were carried out, and a calibration curve was prepared. The milliequivalent of the nitrogen in the sample was determined from the titrated amount of the sample and the calibration curve, and the milliequivalent of the >C=O functional groups per 1 g of carbon black (meq/g) was calculated according to the following equation.

concentration of >C=O functional groups =

$$\frac{\text{amount of nitrogen of oximized carbon black}}{\text{weight of oximized carbon black}} -$$

$$\frac{\text{amount of nitrogen of control carbon black}}{\text{weight of control carbon black}}$$

\*Measurement of Concentration of —OH Functional Groups

1) Preparation of Acetylated Carbon Black 20 ml of pyridine and 10 ml of acetic anhydride were placed in an Erlenmeyer flask containing about 2 g of carbon black. A calcium chloride tube was connected to the upper portion of a condenser, and was placed in the inlet of the Erlenmeyer flask. A stream of nitrogen gas was passed through the apparatus to displace the air such that a nitrogen atmosphere was obtained.

The flask was placed in an oil bath maintained at 120° C., and the reaction was carried out for 15 hours at that temperature. After the reaction was completed, while the reactants were cooling, 100 ml of distilled water was added and the excess acetic anhydride was decomposed. Then, the acetylated carbon black was separated by suction filtration, and rinsed with about 300 ml of distilled water.

The rinsed acetylated carbon black was placed in a drying apparatus maintained at 105° C. and was dried until a constant weight was reached, and the acetylated carbon black was thus prepared.

2) Quantitative Determination of Acetic Acid

About 1 g of the acetylated carbon black was accurately measured and placed in a beaker. A solution in which 2 g of barium hydroxide had been added to 20 ml of heated distilled water was added to the beaker. The beaker was placed in a 100° C. water bath, and hydrolysis was carried out for 5 hours. The contents cooled, and were suction filtered by using a membrane filter. The beaker and the filter were rinsed with a small amount of distilled water. The liquid consisting of the filtrate and the rinsing liquid was passed down a column of Umberlite IR120 (trade name; manufactured by Organo Corporation) of a cation exchange resin activated with hydrochloric acid, so as to liberate the acetic acid. The column was rinsed until the acidity off the acetic acid was no longer observed in the filtrate.

All the liquid which had been passed through the column was gathered and titrated with a 1/500 normal sodium hydroxide solution by using an indicator which was a mixture of methyl red and bromocresol green.

Before titration, a calibration curve was prepared in advance by using a 1/500 normal acetic acid standard solution. The amount of acetic acid in the sample was determined from the aforementioned titration value by using this calibration curve.

The milliequivalent of the —OH Functional groups per 1 g of carbon black (meq/g) was calculated by the following formula.

concentration of —OH functional groups =

$$\frac{\text{acetic acid amount from calibration curve (ml)}}{\text{weight of acetylated carbon black (g)}} \times$$

$$f \times 2 \times 1/10^2$$

wherein f is the titer of the acetic acid standard solution.

\*Measurement of Hysteresis Loss Property

The loss tangent (tang δ) was measured at a tensile dynamic distortion of 1%, a frequency of 50 Hz, and a temperature off 60° C. by using a viscoelasticity spectrometer manufactured by Iwamoto Seisakusho Co., Ltd. The test piece was a slab sheet having a thickness of about 2 mm and a width off 5 mm. The distance between the positions at which the test material was nipped was 2 cm, and the initial load was 160 g. The values of tan δ were expressed as indices with the value for Comparative Example 1 being see to 100. Smaller numbers mean a lower hysteresis loss, which is preferable.

\*Measurement of Wet Skid Resistance

The wet skid resistance was evaluated by measuring the skid resistance at room temperature on a concrete road surface which had been wet with water, by using a Skid Tester manufactured by Stanley London Co. (England). The values were expressed as indices with the value for Comparative Example 1 being set to 100. Here, larger numbers are more preferable.

\*Measurement of Low Rolling Resistance Performance

The rubber composition was used in the tread of a 195/65R15 size tire for a passenger vehicle. The rim 6 JJ tire, which had an internal pressure of 2.0 kg and a load of 440 kg, was set on a drum having an external diameter of 1.7 m. The drum was rotated, and the rolling resistance was calculated in accordance with the following formula from a value calculated from the moment of inertia at the time the drum was coasting at 80 km/h after the speed thereof had been raised to 120 km/h. The numerical values were expressed as indices with the value for Comparative Example 1 being set to 100. Larger numbers are more preferable.

$$\frac{\text{moment of inertia of control tire}}{\text{moment of inertia of test tire}} \times 100$$

\*Measurement of Wet Skid Resistance Performance of Tire

In accordance with the method stipulated in UTQGS (U.S. Tire Quality and Grade Standards), tires were placed on a trailer for testing which was then run on a wet, tightly-packed asphalt road surface. The frictional resistance at the time the rotation of the tires was locked was measured. The numerical values were expressed as indices with the value for Comparative Example 1 being set to 100. Larger values are more preferable.

\*Carbon Blacks used in the Comparative Examples and in the Examples

1) Carbon Blacks used in the Comparative Examples

Carbon black A (control), B, C, D, E and F were all common furnace blacks, and were ASTM code N330, N660, N550, N839, N220 and N110, respectively.

2) Carbon Blacks used in the Examples

Carbon black G was prepared by oxidizing carbon black A for three hours at room temperature in an ozone atmosphere.

Carbon black H was prepared by heating carbon black G for 1 hour at 450° C. in a nitrogen atmosphere.

Carbon black I was prepared by using the gas furnace method with LPG as the raw material.

Carbon black J was channel-type black CK-3 (trade name off a product manufactured by Deggusa AG).

Carbon black K was prepared by oxidizing carbon black J for three hours at room temperature in an ozone atmosphere.

Carbon black L was prepared by heating carbon black K for 1 hour at 450° C. in a nitrogen atmosphere.

Carbon black M was channel-type black Special Black 4A (trade name of a product manufactured by Deggusa AG), which is an oxidized channel-type black.

*Rubbers used in the Comparative Examples and in the Examples

1) SBR was #1500 manufactured by Japan Synthetic Rubber Co., Ltd.

wet skid resistance of the vulcanitizate are listed in Table 3. Further, the results of the evaluation of the performances such as rolling resistance performance and wet skid resistance performance of a 195/65R15 size tire for a passenger vehicle in whose tread the rubber composition was used are listed in Table 4.

(Examples 2 through 10, Comparative Examples 1 through 7)

In the same way as in Example 1, rubber compositions and tires were obtained by using the various types of carbon black and the various types of rubber listed in the tables. The results of the evaluation of the characteristics of the carbon blacks are listed in Table 1, the results of measuring the physical properties of the vulcanizates are listed in Table 3, and the results of evaluating the performances of the tires are listed in Table 4.

TABLE 1

| | Characteristics of Carbon Black | | | | |
|---|---|---|---|---|---|
| | $N_2SA$ $(m^2/g)$ | >CO=O Concentration (meq/g) | —OH Concentration (meq/g) | >C=O/$N_2$SA $(meq/m^2)$ (×100) | (>CO Concentration)- (—OH Concentration)$^2$ + 0.1(—OH Concentration)- 0.03 (meq/g) |
| Type of Carbon Black | | | | | |
| A | 77 | 0.028 | 0.133 | 0.036 | −0.006 |
| B | 26 | 0.003 | 0.084 | 0.012 | −0.026 |
| C | 40 | 0.007 | 0.109 | 0.018 | −0.024 |
| D | 92 | 0.033 | 0.138 | 0.036 | −0.002 |
| E | 115 | 0.031 | 0.192 | 0.027 | −0.017 |
| F | 144 | 0.044 | 0.238 | 0.031 | −0.019 |
| G | 80 | 0.177 | 0.221 | 0.222 | 0.120 |
| H | 81 | 0.044 | 0.172 | 0.054 | 0.002 |
| I | 130 | 0.242 | 0.426 | 0.186 | 0.073 |
| J | 96 | 0.084 | 0.241 | 0.087 | 0.020 |
| K | 93 | 0.182 | 0.376 | 0.195 | 0.048 |
| L | 104 | 0.088 | 0.294 | 0.085 | 0.001 |
| M | 179 | 0.131 | 0.327 | 0.073 | 0.027 |

2) Modified SBR 1 was prepared by copolymerizing 1 kg of styrene and 4 kg of butadiene in a cyclohexane solvent for 30 minutes at 10° C. by using 48 mmol of n-butyllithium and 250 g of tetrahydrofuran. The obtained butadiene-styrene copolymer was coupled with 12 mmol of tin tetrachloride. The styrene content of the copolymer before coupling was 20% by weight, the vinyl linkage content of the butadiene portion was 60%, and the weight average molecular weight was $2.1 \times 10^5$.

3) Modified SBR 2 was obtained by modifying, with 12 mmol of diethylaminobenzophenone, a butadiene/styrene random copolymer obtained in the same manner as SBR1. The molecular structure of the polymer before modification was the same as that off modified SBR1.

(Example 1)

A rubber composition was prepared by using carbon black G, natural rubber, and modified SBR 1, in accordance with the compounding formulations of Tables 2 and 3. The rubber composition was vulcanized at 150° C. for 40 minutes. The results of measurement of the characteristics of carbon black G are listed in Table 1. The results of the evaluation of physical properties such as the hysteresis loss (tan δ) and the

TABLE 2

| Compounding Agent | | Parts By Weight |
|---|---|---|
| Rubber | | 100 |
| Natural rubber | | 30 |
| SBR or modified SBR | | 70 |
| Carbon black | | 50 |
| Stearic acid | | 2 |
| Zinc white | | 3 |
| Antioxidant | 810NA[1] | 1 |
| Accelerator | CZ[2] | 0.6 |
| Accelerator | M[3] | 0.6 |
| Accelerator | D[4] | 0.4 |
| Sulfur | | 1.5 |

[1]N-phenyl-N-isopropyl-p-phenylenediamine
[2]N-cyclohexyl-2-benzothiazolylsulfenamide
[3]2-mercaptobenzothiazole
[4]1,3-diphenylguanidine

TABLE 3

| | | Rubber Component (parts by weight) | | | | Carbon | Physical Properties of Rubber Composition | |
|---|---|---|---|---|---|---|---|---|
| | | NR | SBR | Modified SBR 1 | Modified SBR 2 | Black Type | tanδ 60° C. Index | Wet Skid Index |
| Comparative Examples | 1 | 30 | — | 70 | — | A | 100 | 100 |
| | 2 | 30 | — | 70 | — | B | 64 | 97 |
| | 3 | 30 | — | 70 | — | C | 87 | 99 |
| | 4 | 30 | — | 70 | — | D | 104 | 100 |
| | 5 | 30 | — | 70 | — | E | 133 | 102 |
| | 6 | 30 | — | 70 | — | F | 158 | 102 |
| Examples | 1 | 30 | — | 70 | — | G | 86 | 103 |
| | 2 | 30 | — | 70 | — | H | 71 | 103 |
| | 3 | 30 | — | 70 | — | I | 77 | 103 |
| | 4 | 30 | — | 70 | — | J | 78 | 104 |
| | 5 | 30 | — | 70 | — | K | 69 | 104 |
| | 6 | 30 | — | 70 | — | L | 67 | 105 |
| | 7 | 30 | — | 70 | — | M | 52 | 106 |
| Comparative Example | 7 | 30 | 70 | — | — | A | 112 | 99 |
| Examples | 8 | 30 | 70 | — | — | J | 97 | 101 |
| | 9 | 30 | — | — | 70 | J | 70 | 103 |
| | 10 | 30 | — | — | 70 | M | 46 | 104 |

TABLE 4

| | | Rubber Component (parts by weight) | | | | Carbon | Tire Performance | |
|---|---|---|---|---|---|---|---|---|
| | | NR | SBR | Modified SBR 1 | Modified SBR 2 | Black Type | Rolling Resistance Index | Wet Skid Index |
| Comparative Examples | 1 | 30 | — | 70 | — | A | 100 | 100 |
| | 2 | 30 | — | 70 | — | B | 105 | 96 |
| | 3 | 30 | — | 70 | — | C | 103 | 98 |
| | 4 | 30 | — | 70 | — | D | 99 | 100 |
| | 5 | 30 | — | 70 | — | E | 95 | 101 |
| | 6 | 30 | — | 70 | — | F | 84 | 102 |
| Examples | 1 | 30 | — | 70 | — | G | 103 | 103 |
| | 2 | 30 | — | 70 | — | H | 103 | 102 |
| | 3 | 30 | — | 70 | — | I | 103 | 104 |
| | 4 | 30 | — | 70 | — | J | 103 | 105 |
| | 5 | 30 | — | 70 | — | K | 105 | 104 |
| | 6 | 30 | — | 70 | — | L | 105 | 103 |
| | 7 | 30 | — | 70 | — | M | 112 | 107 |
| Comparative Example | 7 | 30 | 70 | — | — | A | 96 | 98 |
| Examples | 8 | 30 | 70 | — | — | J | 101 | 101 |
| | 9 | 30 | — | — | 70 | J | 106 | 102 |
| | 10 | 30 | — | — | 70 | M | 114 | 104 |

As can be seen from Table 3, the rubber compositions of one embodiment of the present invention, in which were used carbon blacks having characteristic X and characteristic Y, exhibited excellent low hysteresis loss property and at the same time had high levels of wet skid resistance. Further, as is clear from Table 4, for pneumatic tires using these rubber compositions, the low rolling resistance performance was greatly improved, and the wet skid resistance performance was also outstanding.

As can be seen from Comparative Examples 1 through 7, rubber compositions, in which were used carbon blacks not having both of the two claimed characteristics of the present invention, were inferior with respect to one of low hysteresis loss property and wet skid resistance. Namely, there exists an inverse relationship between low hysteresis loss property and wet skid resistance. Tires using these rubber compositions similarly cannot simultaneously exhibit satisfactory low rolling resistance performance and wet skid resistance performance. As can be seen from Example 8 (in which ordinary SBR is used) and other Examples (in which modified SBR is used), in the present invention, rubber compositions using modified SBR as the rubber component and tires using these rubber compositions exhibit better effects.

(Example 11)

A rubber composition was prepared in accordance with the compounding formulations of Table 5 and Table 6 by using carbon black J, natural rubber, SBR and silane coupling agent Si69 (trade name of a product manufactured by Deggusa AG). The rubber composition was vulcanized for 40 minutes at 150° C. The results of measuring the characteristics of carbon black J are listed in Table 1. The results of the evaluation of physical properties such as the hysteresis loss (tan δ) and the wet skid resistance of the vulcanizate are listed in Table 6. Further, the results of the evaluation of the performances such as rolling resistance performance and wet skid resistance performance of a 195/65R15 size tire for a passenger vehicle in whose tread the rubber composition was used are listed in Table 7.

(Examples 12–20)

In the same way as in Example 11, rubber compositions and tires were obtained by using the various types of carbon black (G through M) and the various types of additives listed in the tables. The results of evaluation of the characteristics of the carbon blacks are Listed in Table 1, the results of measurement of the physical properties of the vulcanizates are listed in Table 6, and the results of the evaluation of the performances of the tires are listed in Table 7.

(Comparative Examples 8 and 13)

Rubber compositions and tires were obtained by using carbon black A (in Comparative Example 8) and carbon black J (in Comparative Example 13) in the same way as in Example 11, except that additives were not used in either of Comparative Examples 8 and 13. The results of measurement of the characteristics of the carbon blacks are listed in Table 1, the results of measurement of the physical properties of the vulcanizates are listed in Table 6, and the results of the evaluation off the performances of the tires are listed in Table 7.

(Comparative Examples 9 through 12, 14 through 18)

Rubber compositions and tires were obtained in the same was as in Example 11 by using various types of carbon blacks (A through F) and various types of additives. The results of measurement of the characteristics of the carbon blacks are listed in Table 1, the results of measurement of the physical properties off the vulcanizates are listed in Table 6, and the results off evaluation off the performances of the tires are listed in Table 7.

TABLE 5

| Compounding Agent | | Parts By Weight |
|---|---|---|
| Rubber | | 100 |
| Natural rubber | | 30 |
| SBR | | 70 |
| Additive | | See Table 6 |
| Silane coupling agent | | |
| Hydrazide compound | | |
| Thiadiazole compound | | |
| Carbon black | | 50 |
| Stearic acid | | 2 |
| Zinc white | | 3 |
| Antioxidant | 810NA[1] | 1 |
| Accelerator | CZ[2] | 0.6 |
| Accelerator | M[3] | 0.6 |
| Accelerator | D[4] | 0.4 |
| Sulfur | | 1.5 |

[1]N-phenyl-N-isopropyl-p-phenylenediamine
[2]N-cyclohexyl-2-benzothiazolylsulfenamide
[3]2-mercaptobenzothiazole
[4]1,3-diphenylguanidine

TABLE 6

| | | Rubber Component (parts by weight) | | Additive (parts by weight) | | | | Carbon Black | Physical Properties of Rubber Composition | |
|---|---|---|---|---|---|---|---|---|---|---|
| | | NR | SBR[1] | C[2] | H1[3] | H2[4] | T[5] | Type | tanδ 60° C. Index | Wet Skid Index |
| Comparative | 8 | 30 | 70 | — | — | — | — | A | 128 | 96 |
| Examples | 9 | 30 | 70 | 2 | — | — | — | A | 115 | 97 |
| | 10 | 30 | 70 | — | 0.5 | — | — | A | 112 | 96 |
| | 11 | 30 | 70 | — | — | 1 | — | A | 113 | 96 |
| | 12 | 30 | 70 | — | — | — | 0.5 | A | 108 | 95 |
| | 13 | 30 | 70 | — | — | — | — | J | 100 | 100 |
| Examples | 11 | 30 | 70 | 2 | — | — | — | J | 87 | 101 |
| | 12 | 30 | 70 | — | 0.5 | — | — | J | 77 | 101 |
| | 13 | 30 | 70 | — | — | 1 | — | J | 78 | 102 |
| | 14 | 30 | 70 | — | — | — | 0.5 | J | 73 | 101 |
| Comparative | 14 | 30 | 70 | — | 0.5 | — | — | B | 91 | 93 |
| Examples | 15 | 30 | 70 | — | 0.5 | — | — | C | 104 | 95 |
| | 16 | 30 | 70 | — | 0.5 | — | — | D | 116 | 97 |
| | 17 | 30 | 70 | — | 0.5 | — | — | E | 140 | 98 |
| | 18 | 30 | 70 | — | 0.5 | — | — | F | 163 | 99 |
| Examples | 15 | 30 | 70 | — | 0.5 | — | — | G | 85 | 101 |
| | 16 | 30 | 70 | — | 0.5 | — | — | H | 70 | 101 |
| | 17 | 30 | 70 | — | 0.5 | — | — | I | 76 | 102 |
| | 18 | 30 | 70 | — | 0.5 | — | — | K | 70 | 101 |
| | 19 | 30 | 70 | — | 0.5 | — | — | L | 66 | 102 |
| | 20 | 30 | 70 | — | 0.5 | — | — | M | 54 | 103 |

[1]SBR: #1500 manufactured by Japan Synthetic Rubber Co., Ltd.
[2]C: silane coupling agent; Si69 (trade name-manufactured by Deggusa AG), bis-(3-triethoxysilylpropyl) tetrasulfide
[3]H1: hydrazide compound; IDH, isophthaloyl dihydrazide
[4]H2: hydrazide compound; HNH, 2-hydroxy-3-naphthoyl hydrazide
[5]T: thiadiazole compound; 2,5-dimercapto-1,3,4-thiadiazole

TABLE 7

| | | Rubber Component (parts by weight) | | Additive (parts by weight) | | | | Carbon Black | Tire Performance | |
|---|---|---|---|---|---|---|---|---|---|---|
| | | | | | | | | | Rolling Resistance | Wet Skid |
| | | NR | SBR[1] | C[2] | H1[3] | H2[4] | T[5] | Type | Index | Index |
| Comparative | 8 | 30 | 70 | — | — | — | — | A | 97 | 95 |
| Examples | 9 | 30 | 70 | 2 | — | — | — | A | 98 | 96 |
| | 10 | 30 | 70 | — | 0.5 | — | — | A | 99 | 95 |
| | 11 | 30 | 70 | — | — | 1 | — | A | 98 | 94 |
| | 12 | 30 | 70 | — | — | — | 0.5 | A | 99 | 95 |
| | 13 | 30 | 70 | — | — | — | — | J | 100 | 100 |
| Examples | 11 | 30 | 70 | 2 | — | — | — | J | 101 | 101 |
| | 12 | 30 | 70 | — | 0.5 | — | — | J | 103 | 102 |
| | 13 | 30 | 70 | — | — | 1 | — | J | 102 | 103 |
| | 14 | 30 | 70 | — | — | — | 0.5 | J | 104 | 101 |
| Comparative | 14 | 30 | 70 | — | 0.5 | — | — | B | 104 | 91 |
| Examples | 15 | 30 | 70 | — | 0.5 | — | — | C | 102 | 94 |
| | 16 | 30 | 70 | — | 0.5 | — | — | D | 98 | 96 |
| | 17 | 30 | 70 | — | 0.5 | — | — | E | 95 | 96 |
| | 18 | 30 | 70 | — | 0.5 | — | — | F | 83 | 98 |
| Examples | 15 | 30 | 70 | — | 0.5 | — | — | G | 103 | 101 |
| | 16 | 30 | 70 | — | 0.5 | — | — | H | 103 | 101 |
| | 17 | 30 | 70 | — | 0.5 | — | — | I | 104 | 102 |
| | 18 | 30 | 70 | — | 0.5 | — | — | K | 105 | 102 |
| | 19 | 30 | 70 | — | 0.5 | — | — | L | 105 | 101 |
| | 20 | 30 | 70 | — | 0.5 | — | — | M | 110 | 104 |

[1]SBR: #1500 manufactured by Japan Synthetic Rubber Co., Ltd.
[2]C: silane coupling agent; Si69 (trade name-manufactured by Deggusa AG), bis-(3-triethoxysilylpropyl) tetrasulfide
[3]H1: hydrazide compound; IDH, isophthaloyl dihydrazide
[4]H2: hydrazide compound; HNH, 2-hydroxy-3-naphthoyl hydrazide
[5]T: thiadiazole compound; 2,5-dimercapto-1,3,4-thiadiazole As can be seen from Table 6, the rubber compositions of the present invention, in which were used carbon blacks having characteristic X and specific additives, exhibited excellent low hysteresis loss property and at the same time had high levels of wet skid resistance. Further, as is clear from Table 7, for pneumatic tires using these rubber compositions, the low rolling resistance performance was greatly improved, and the wet skid resistance performance was also outstanding.

As can be seen from Comparative Examples 8 through 18, rubber compositions using carbon blacks falling outside of the scope of the claimed invention (Comparative Examples 8 through 12, 14 through 18) were inferior with respect to both low hysteresis loss property and wet skid resistance regardless of whether the specific additives were used therein. Similarly, tires using these rubber compositions could not exhibit both low rolling resistance performance and wet skid resistance performance simultaneously. Further, in a case in which a carbon black falling within the scope of the claimed invention was used but the additives were not used (Comparative Example 13), the obtained rubber composition and tire could not exhibit the effects of the present invention.

What is claimed is:

1. A rubber composition comprising:
   a rubber component consisting of at least one rubber selected from the group consisting of conjugated diene-base synthetic rubbers and natural rubber; and
   a carbon black in an amount of 30 to 120 parts by weight per 100 parts by weight of the rubber component,
   wherein the carbon black has both of the characteristics represented by following equation (I) and equation (II):

Equation (I)

$$(\text{concentration of} >\!\!C\!\!=\!\!O \text{ functional groups})/N_2SA \geq 4.0 \times 10^{-4}$$

Equation (II)

$$(\text{concentration of} >\!\!C\!\!=\!\!O \text{ functional groups}) \geq (\text{concentration of} -\!\!OH \text{ functional groups})^2 - 0.1 \times (\text{concentration of} -\!\!OH \text{ functional groups}) + 0.03$$

wherein (concentration of $>\!\!C\!\!=\!\!O$ functional groups) expresses the concentration (meq/g) off functional groups which react with hydroxylamine and produce oxime; $N_2SA$ expresses the nitrogen absorption specific surface area (m²/g); and (concentration of —OH functional groups) expresses the concentration (meq/g) of functional groups which participate in an acetylating reaction with acetic anhydride.

2. A rubber composition according to claim 1, wherein the conjugated diene-base synthetic rubber is at least one of polybutadiene rubber and styrene-butadiene rubber.

3. A rubber composition according to claim 1, wherein the conjugated diene-base synthetic rubber is a rubber containing a functional group selected from the group consisting of tin-containing groups and nitrogen-containing groups.

4. A rubber composition according to claim 1, wherein the conjugated diene-base synthetic rubber is a rubber consisting of at least one of polybutadiene rubber and styrene-butadiene rubber containing a functional group selected from the group consisting of tin-containing groups and nitrogen-containing groups.

5. A rubber composition according to claim 1, wherein the carbon black is obtained by oxidizing, by an oxidizing agent, at least one of furnace black and channel-type carbon black.

6. A rubber composition according to claim 1, wherein the carbon black is obtained by oxidizing, by an oxidizing agent, at least one of furnace black and channel-type carbon black, and then subjecting the oxidized carbon black to heating at temperatures of 100° to 900° C.

7. A pneumatic tire having a tread portion, sidewall portions and bead portions, said tread portion comprises a rubber composition as claimed in claim 1.

8. A pneumatic tire according to claim 7, wherein the conjugated diene-base synthetic rubber is at least one of polybutadiene rubber and styrene-butadiene rubber.

9. A pneumatic tire according to claim 7, wherein the conjugated diene-base synthetic rubber is a rubber containing a functional group selected from the group consisting of tin-containing groups and nitrogen-containing groups.

10. A pneumatic tire according to claim 7, wherein the conjugated diene-base synthetic rubber is a rubber consisting of at least one of polybutadiene rubber and styrene-butadiene rubber containing a functional group selected from the group consisting of tin-containing groups and nitrogen-containing groups.

11. A pneumatic tire according to claim 7, wherein the carbon black is obtained by oxidizing, by an oxidizing agent, at least one of furnace black and channel-type carbon black.

12. A pneumatic tire according to claim 7, wherein the carbon black is obtained by oxidizing, by an oxidizing agent, at least one of furnace black and channel-type carbon black, and then subjecting the oxidized carbon black to heating at temperatures of 100° to 900° C.

13. A rubber composition comprising:
a rubber component consisting of at least one rubber selected from the group consisting of conjugated diene-base synthetic rubbers and natural rubber;
30 to 120 parts by weight, per 100 parts by weight of the rubber component, of a carbon black having the characteristic represented by following equation (I); and
0.05 to 5.0 parts by weight, per 100 parts by weight of the rubber component, of at least one of:
a hydrazide compound selected from the group consisting of compounds represented by following general formulae (V), (VI) and (VII), and
a thiadiazole compound selected from the group consisting of compounds represented by following general formula (VIII);

Equation (I)

(concentration of >C=O functional groups)/N$_2$SA≧4.0×10$^{-4}$ wherein (concentration of >C=O functional groups) expresses the concentration (meq/g) of functional groups which react with hydroxylamine and produce oxime; and N$_2$SA expresses the nitrogen absorption specific surface area (m$^2$/g)

  General Formula (V)

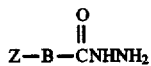  General Formula (VI)

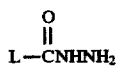  General Formula (VII)

wherein A represents an aromatic ring, a saturated or unsaturated hydantoin ring, or a linear saturated or unsaturated alkyl group having from 1 to 18 carbon atoms; n is 0 or 1; B represents an aromatic ring; Z represents a hydroxyl group or an amino group; and L represents a pyridyl group or a hydrazino group;

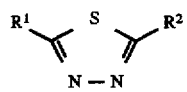  General Formula (VIII)

wherein R$^1$ represents a mercapto group; and R$^2$ represents a mercapto group, an amino group or a trifluoromethyl group.

14. A rubber composition according to claim 13, wherein the conjugated diene-base synthetic rubber is at least one of polybutadiene rubber and styrene-butadiene rubber.

15. A rubber composition according to claim 13, wherein the carbon black is obtained by oxidizing, by an oxidizing agent, at least one of furnace black and channel-type carbon black.

16. A rubber composition according to claim 13, wherein the carbon black is obtained by oxidizing, by an oxidizing agent, at least one of furnace black and channel-type carbon black, and then subjecting the oxidized carbon black to heating at temperatures of 100° to 900° C.

17. A pneumatic tire having a tread portion, sidewall portions and bead portions, said tread portion comprises a rubber composition as claimed in claim 13.

18. A pneumatic tire according to claim 17, wherein the conjugated diene-base synthetic rubber is at least one of polybutadiene rubber and styrene-butadiene rubber.

19. A pneumatic tire according to claim 17, wherein the carbon black is obtained by oxidizing, by an oxidizing agent, at least one of furnace black and channel-type carbon black.

20. A pneumatic tire according to claim 17, wherein the carbon black is obtained by oxidizing, by an oxidizing agent, at least one of furnace black and channel-type carbon black, and then subjecting the oxidized carbon black to heating at temperatures of 100° to 900° C.

21. A rubber composition comprising:
a rubber component consisting of at least one rubber selected from the group consisting of conjugated diene-base synthetic rubbers and natural rubber;
30 to 120 parts by weight, per 100 parts by weight of the rubber component, of a carbon black having both of the characteristics represented by following equation (I) and equation (II); and
0.05 to 5.0 parts by weight, per 100 parts by weight of the rubber component, of at least one of:
a silane coupling agent selected from the group consisting of compounds represented by following general formulae (III) and (IV),
a hydrazide compound selected from the group consisting of compounds represented by following general formulae (V), (VI) and (VII), and
a thiadiazole compound selected from the group consisting of compounds represented by following general formula (VIII);

Equation (I)

(concentration of >C=O functional groups)/N$_2$SA≧4.0×10$^{-4}$

Equation (II)

(concentration of >C=O functional groups)≧(concentration of —OH functional groups)$^2$−0.1×(concentration of —OH functional groups)+0.03 wherein (concentration of >C=O functional groups) expresses the concentration (meq/g) of functional groups which react with hydroxylamine and produce oxime; N$_2$SA expresses the nitrogen absorption specific surface area (m$^2$/g); and (concentration of —OH functional groups) expresses the concentration (meq/g) of functional groups which participate in an acetylating reaction with acetic anhydride;

General Formula (III)

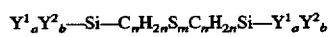

or

wherein $X^1$ represents a nitroso group, a mercapto group, an amino group, an epoxy group, a vinyl group, a chlorine atom, or an imide group; $Y^1$ represents an alkoxy group having from 1 to 4 carbon atoms or a chlorine atom; $Y^2$ represents an alkyl group having from 1 to 4 carbon atoms; a is an integer from 1 to 3, b is an integer from 0 to 2, and a+b=3; and n and m are respectively integers from 1 to 6;

General Formula (IV)

$$Y^1{}_a Y^2{}_b-SiC_n H_{2n} S_m-X^2$$

wherein $X^2$ is represented by the following formula:

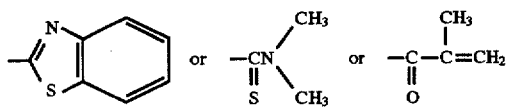

wherein $Y^1$ represents an alkoxy group having from 1 to 4 carbon atoms or a chlorine atom; $Y^2$ represents an alkyl group having from 1 to 4 carbon atoms; a is an integer from 1 to 3, b is an integer from 0 to 2, and a+b=3; and n and m are respectively integers from 1 to 6;

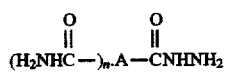 General Formula (V)

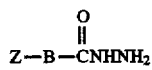 General Formula (VI)

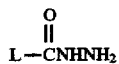 General Formula (VII)

wherein A represents an aromatic ring, a saturated or unsaturated hydantoin ring, or a linear saturated or unsaturated alkyl group having from 1 to 18 carbon atoms; n is 0 or 1; B represents an aromatic ring; Z represents a hydroxyl group or an amino group; and L represents a pyridyl group or a hydrazino group;

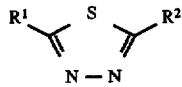 General Formula (VIII)

wherein $R^1$ represents a mercapto group; and $R^2$ represents a mercapto group, an amino group or a trifluoromethyl group.

22. A rubber composition according to claim 21, wherein the conjugated diene-base synthetic rubber is at least one of polybutadiene rubber and styrene-butadiene rubber.

23. A rubber composition according to claim 21, wherein the carbon black is obtained by oxidizing, by an oxidizing agent, at least one of furnace black and channel-type carbon black.

24. A rubber composition according to claim 21, wherein the carbon black is obtained by oxidizing, by an oxidizing agent, at least one of furnace black and channel-type carbon black, and then subjecting the oxidized carbon black to heating at temperatures of 100° to 900° C.

25. A pneumatic tire having a tread portion, sidewall portions and bead portions, said tread portion comprising a rubber composition as claimed in claim 21.

26. A pneumatic tire according to claim 25, wherein the conjugated diene-base synthetic rubber is at least one of polybutadiene rubber and styrene-butadiene rubber.

27. A pneumatic tire according to claim 25, wherein the carbon black is obtained by oxidizing, by an oxidizing agent, at least one of furnace black and channel-type carbon black.

28. A pneumatic tire according to claim 25, wherein the carbon black is obtained by oxidizing, by an oxidizing agent, at least one of furnace black and channel-type carbon black, and then subjecting the oxidized carbon black to heating at temperatures of 100° to 900° C.

* * * * *